United States Patent

[11] 3,597,695

[72] Inventors James E. Swain;
Lloyd L. Steinmetz; Frank Rainer, all of Livermore, Calif.
[21] Appl. No. 827,255
[22] Filed May 23, 1969
[45] Patented Aug. 3, 1971
[73] Assignee The United States of America as represented by the United States Atomic Energy Commission

[54] SINGLE-CAVITY REGENERATIVE LASER PULSE AMPLIFIER
10 Claims, 2 Drawing Figs.
[52] U.S. Cl..................................................... 330/4.3, 331/94.5
[51] Int. Cl...................................................... H01s 3/00
[50] Field of Search............................................ 330/4.3; 331/94.5; 350/169, 174

[56] References Cited
UNITED STATES PATENTS
3,243,724  3/1966  Vuylsteke..................... 331/94.5
3,277,392  10/1966  Nicolai......................... 331/94.5

Primary Examiner—Rodney D. Bennett, Jr.
Assistant Examiner—J. M. Potenza
Attorney—Roland A. Anderson ABSTRACT: An apparatus for amplifying laser light by multiple passes through a lasing material in a single laser cavity. A single amplifier stage now achieves what has been previously accomplished by several stages. This is accomplished by a switching mechanism which directs a laser beam into and out of the cavity at selected time intervals, thereby enabling amplification of low intensity laser pulses having a time width anywhere in the range of picoseconds to nanoseconds, to energy levels near the damage limit of the optical components of the system.

PATENTED AUG 3 1971         3,597,695

INVENTORS
JAMES E. SWAIN
LLOYD L. STEINMETZ
FRANK RAINER
BY
ATTORNEY

SINGLE-CAVITY REGENERATIVE LASER PULSE AMPLIFIER

BACKGROUND OF THE INVENTION

The invention described herein was made in the course of, or under, Contract No. W-7405-ENG-48, with the United States Atomic Energy Commission.

This invention relates to apparatus for amplifying laser light by multiple passes through a lasing material, and more particularly to such an apparatus which constitutes a single laser cavity with mechanism for switching an input laser pulse into the cavity and out, after it has made a finite predetermined number of passes through the lasing medium.

The conventional method for amplifying laser pulses is to input the pulse into a series of aligned laser amplifiers, separately pumped. Such a method is very inefficient in its use of energy stored in the laser material.

SUMMARY OF THE INVENTION

The present invention provides a single stage laser amplifier which achieves what has previously been accomplished by several stages. In the inventive single-stage amplifier, a laser pulse is switched into a lasing cavity and then switched out of the cavity after making a finite predetermined number of passes through the cavity, acquiring energy on each pass. The switching mechanism has, for example, a time resolution on the order of 0.1 nanoseconds relative to time-of-arrival of a laser pulse.

Therefore it is an object of this invention to provide a single-stage laser amplifier which achieves what has previously been accomplished by several stages.

A further object of the invention is to provide an apparatus for amplifying laser pulses which includes mechanism for switching such pulses into and out of a single laser cavity, after the pulses have made a finite predetermined number of passes through the lasing medium in the cavity.

Another object of the invention is to provide a switching apparatus for a single-cavity laser pulse amplifier.

Another object of the invention is to provide a switching mechanism for a single-stage laser amplifier which has a time resolution on the order of 0.1 nanoseconds relative to time-of-arrival of a laser pulse.

Other objects of the invention will become readily apparent from the following description and accompanying drawings.

DESCRIPTION OF THE EMBODIMENTS

Figure 1:
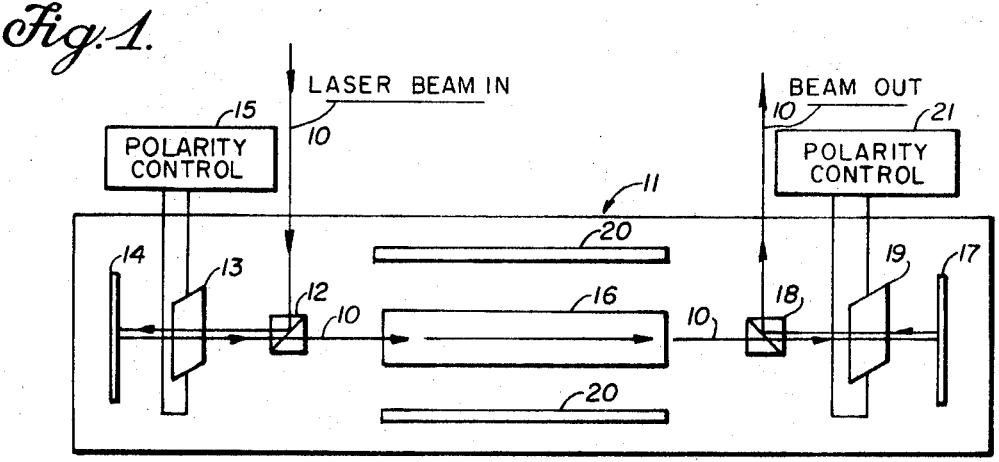
FIG. 1 is a schematic illustration of a first embodiment of the invention.

Referring now to the FIG. 1 embodiment, a beam pulse 10 generator by a laser (not shown) enters a single-stage laser amplifier apparatus generally indicated at 11. A first birefringent crystal or polarizing prism 12 intercepts the previously polarized beam 10, the crystal 12 being oriented, as known in the art, so that the beam 10 is reflected thereby and then passes through a controlled polarity rotator 13, such as a quarter-wave Pockel's cell, then to a 99 percent reflecting mirror 14 whereupon the beam 10 is reflected back through rotator 13. Each double-pass transit of rotator 13 rotates the polarization angle of beam component 10 by 90° when rotator 13 has been activated by a polarity control means 15. The 90° rotation of the polarization of the beam 10, due to the two transits of the beam through rotator 13, enables the beam 10 to take a path through the birefringent crystal 12 in which the beam will pass through lasing material 16. Once the polarity of the beam 10 is rotated 90°, rotator 13 is deactivated by control means 15 so that it no longer affects the beam. The beam 10 is then able to oscillate between the mirror 14 and another 99 percent reflecting mirror 17 beyond lasing material 16 upon passing through a second properly oriented birefringent crystal or prism 18 and a deactivated rotator 19. Lasing material 16, excited conventionally by a source 20, amplifies the beam 10 as it passes through the apparatus 11. Although only a single pass of beam 10 through lasing material 16 is illustrated, many passes through the material actually occur due to the beam being reflected back and forth between mirrors 14 and 17. Pockel's cells are known in the art and the details thereof do not constitute part of the invention, but a greater understanding of these cells can be obtained from USAEC Report UCRL-50463 entitled "Pockel's Cells: Theory, Test Procedure, Characteristics" by W. E. Adams, Lawrence Radiation Laboratory, University of California, Aug., 1968.

To extract the amplified beam 10 from apparatus 11, the beam passes through the second birefringent crystal or polarizing prism 18 then through rotator 19 which is now activated by a polarity control means 21 and is reflected by mirror 17 back through rotator 19, whereby the polarization angle of the beam 10 is again rotated 90° after two transits of activated rotator 19. Crystal 18 then deflects the beam 10 out of apparatus 11 due to the change of polarization of the beam by rotator 19. Again it is pointed out, that while beam 10 is oscillating between mirrors 14 and 17 polarity controls 15 and 21 are not activated. Polarity control 15 is activated only to start oscillations, while polarity control 21 is activated only to terminate oscillations and remove the beam 10 in its amplified state from apparatus 11. The time resolution thereof is on the order of a few nanoseconds, relative to the time-of-arrival of the input pulse.

Figure 2:
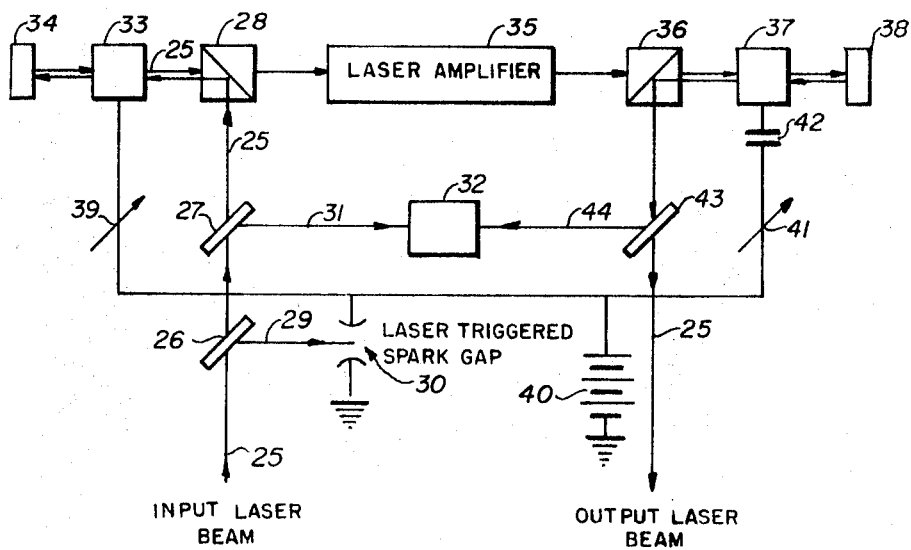
FIG. 2 is a schematic illustration of the preferred embodiment of the invention.

The preferred embodiment illustrated in FIG. 2 is similar in basic construction to the FIG. 1 embodiment except in the mechanisms for switching the laser pulse into and out of the lasing cavity which provides a smaller time resolution. In the FIG. 2 embodiment, a laser beam pulse 25 to be amplified is directed through beam splitters 26 and 27 into a polarizing prism 28. The construction details of the beam splitters and polarizing prism are conventional and well known in the art and thus need not be described herein. The split-off beam from splitter 26, indicated at 29, triggers a laser-triggered spark gap assembly generally indicated at 30. The details of assembly 30 are not essential to this invention and are described in detail in an article entitled "Laser-Triggered Spark Gap" published in The Review of Scientific Instruments, Vol. 39, Number 6, June, 1968, pages 904—909 by Lloyd L. Steinmetz, coinventor in this invention. The split-off beam from splitter 27, indicated at 31, drives a photodiode 32 for monitoring as described hereinbelow. The polarizing prism 28 directs the input laser beam 25 through a first Pockel's cell 33 to a 99 percent reflecting mirror 34 which reflects the beam 25 back through cell 33. The voltage on the Pockel's cell 33 is initially set for a quarter-wavelength rotation by delay-line mechanism described hereinafter. Thus, after making a double pass through the Pockel's cell 33, the polarization of the input laser beam is rotated 90°, as described above with respect to the rotators in the FIG. 1 embodiment. This change in polarization enables the beam 25 to pass through the polarizing prism 28 and enter the lasing medium within amplifier or cavity 35 and is amplified thereby. After leaving the lasing medium of amplifier 35, the beam passes through a second 99 percent reflecting polarizing prism 36, a second Pockel's cell 37, and is reflected back through the system by a second mirror 38. The voltage on the second Pockel's cell 37 is initially set at zero potential, and consequently the cell has no effect on the polarization of the laser beam. Before the amplified laser beam 25 returns to the first Pockel's cell 33, through amplifier 35 and prism 28, the voltage on cell 33 is switched to zero via an adjustable voltage pulse delay line 39 connected between the spark-gap assembly 30 and the Pockel's cell 33, delay line 39 being connected to a power supply 40. With the Pockel's cell 33 operating at zero potential, the laser beam 25 is trapped within the laser cavity (amplifier 35) bounded by mirrors 34 and 38. While only one pass through the system is illustrated, the beam 25 is allowed to reflect back and forth in the cavity for a number of passes, gaining energy on each pass. The number of passes through the lasing medium of amplifier 35 is determined by the length of an adjustable second delay line 41 which is connected between the spark-gap assembly 30 and the second Pockel's cell 37, delay line 41 also being operatively connected to power supply 40. A capacitor 42 is connected intermediate Pockel's cell 37 and delay line 41. After a preset number of passes, or, equivalently, a preset time interval determined by the difference in length of delay lines 39 and 41, the voltage applied to Pockel's cell 37 is switched to the quarter-wavelength value by the voltage pulse coming from the spark-gap assembly 30 via delay line 41. The amplified laser pulse beam 25 from mirror 34 after making a double pass through the second Pockel's cell 37 via mirror 38, has its polarization rotated 90°, whereupon the second polarizing prism 36 reflects the pulse out of the cavity or amplifier 35. The output beam then traverses a third beam splitter 43, from which a split-off output beam 44 drives the same photodiode 32 for comparison to the input beam 31 thereto. The time resolution of this embodiment is on the order of 0.1 nanoseconds relative to time-of-arrival of a laser pulse, and has a low optical power-triggering threshold.

The number of passes the laser beam 25 makes through the cavity or amplifier 35 can be varied by changing the second delay line 41. Also, the single-pass gain of the system can be varied by changing the pumping rate or level of the amplifier 35. The upper limit of the gain is only limited by the damage limit of the optical components making up the system.

The energy output of the laser amplifier is limited to the maximum energy level at which the weakest optical component of the system can operate. For the above-described system, the weakest component would be the Pockel's cells, and not the lasing medium.

With the FIG. 2 embodiment, an amplification factor of 3,000 was obtained with a 9-inch by one-half inch A. O. 01720 neodymium laser rod housed in a cylindrical head having a 24-kilojoule maximum pump energy capacity. Input pulse intensity was 0.001 joules/cm.$^2$; output pulse intensity was 3 joules/cm.$^2$; both having a time width of approximately 4.3 nanoseconds FWHM.

It is thus seen that many-pass resonant laser amplifier systems made in accordance with this invention will have extensive utility wherever it is desirable to amplify low energy laser pulses having a time width on the order of picoseconds, up to a few nanoseconds, to high energy levels on the order of a few J/cm.$^2$. Such short, high energy pulses are useful for many industrial and research purposes.

In addition, the switching mechanism of the FIG. 2 embodiment can be used to switch a plurality of Pockel's cells simultaneously or sequentially, thereby enabling simultaneous or sequential operation of independent lasers, or simultaneous or sequential operations on a single laser pulse.

While the invention has been specifically directed to amplifying a laser pulse, the apparatus can be utilized as an optical delay line with oscillations of the pulse between the mirrors being maintained for the duration of the desired delay.

It is thus seen that the present invention provides an apparatus particularly adapted for amplifying laser pulses having a very narrow time limit in a single cavity or stage. This being accomplished by novel switching mechanism whereby an input laser pulse is switched into a lasing cavity and out, after it has made a finite number of passes through the lasing medium, gaining energy on each pass. The present invention utilizes switching mechanism which has a time resolution on the order of 0.1 nanoseconds relative to time-of-arrival of a laser pulse. Thus, the present invention has accomplished with a single-cavity laser pulse amplifier that which has been done by a series of aligned laser cavities, separately pumped, thereby greatly advancing the state of the laser amplification art.

Although particular embodiments of the invention have been illustrated and described, changes and modifications will become apparent to those skilled in the art, and it is intended to cover in the appended claims all such modifications and changes as come within the spirit and scope of the invention.

We claim:

1. A single-cavity laser pulse amplifier apparatus comprising: an optical cavity adapted for containing a lasing material, means for exciting a lasing material adapted to be contained in said optical cavity, and means positioned adjacent opposite ends of said optical cavity for switching an input laser pulse into said cavity means, and out of said optical cavity after such a pulse has made at least one pass through said optical cavity, said switching means including means for changing the direction of a laser input pulse, means for rotating the polarity of a laser input pulse, means for controlling said polarity rotating means, and means for reflecting a laser input pulse back through said polarity rotating means.

2. The apparatus defined in claim 1, wherein said direction changing means comprises a pair of prismlike means positioned adjacent opposite ends of said optical cavity, wherein said polarity rotating means includes a pair of Pockel's cells positioned adjacent said prismlike means adjacent opposite ends of said optical cavity, and wherein said reflecting means includes a pair of mirrorlike means positioned adjacent said Pockel's cells at opposite ends of said optical cavity.

3. The apparatus defined in claim 2, wherein said polarity controlling means comprises a pair of control means for changing voltage applied to said Pockel's cells such that one of said pair of Pockel's cells is activated by one of said control means and the other of said Pockel's cells is deactivated by the other of said control means for switching a laser pulse into said optical cavity, and said one of said Pockel's cells is deactivated by said one of said control means and said other of said Pockel's cells is activated by said other of said control means for switching a laser pulse out of said optical cavity after such a pulse has been reflected by said mirrorlike means so as to make at least one pass through said optical cavity.

4. The apparatus defined in claim 3, wherein said pair of control means each comprise an adjustable voltage pulse delay line means, and wherein said polarity controlling means includes means for activating each of said delay line means.

5. The apparatus defined in claim 4, wherein said spark-gap means comprises a power supply means and a spark-gap assembly, and means for actuating said spark-gap assembly.

6. The apparatus defined in claim 5, wherein said spark-gap assembly actuating means includes a beam splitting means which functions to split off a portion of an input laser beam, said split-off beam portion triggering said spark-gap assembly.

7. The apparatus defined in claim 5, additionally including means for comparing an input pulse into said cavity means with an output pulse from said optical cavity, said comparing means including a photodiode means and a pair of beam splitter means, one of said beam splitter means functioning to direct a portion of an input pulse to said optical cavity into said photodiode means, the other of said beam splitter means functioning to direct a portion of an output pulse from said optical cavity into said photodiode means.

8. The apparatus defined in claim 1, wherein said controlling means for said polarity rotating means comprises a pair of adjustable voltage pulse delay line means, and means for activating each of said delay line means.

9. The apparatus defined in claim 8, wherein said delay line activating means includes a spark-gap assembly, and means for actuating said spark-gap assembly.

10. The apparatus defined in claim 9, wherein said spark-gap assembly actuating means includes a beam splitting means functioning to slit off a portion of an input laser beam for triggering said spark-gap assembly.